United States Patent [19]

Kolls

[11] Patent Number: 5,619,024
[45] Date of Patent: Apr. 8, 1997

[54] CREDIT CARD AND BANK ISSUED DEBIT CARD OPERATED SYSTEM AND METHOD FOR CONTROLLING AND MONITORING ACCESS OF COMPUTER AND COPY EQUIPMENT

[75] Inventor: Brock Kolls, Phoenixville, Pa.

[73] Assignee: USA Technologies, Inc., Wayne, Pa.

[21] Appl. No.: 354,207

[22] Filed: Dec. 12, 1994

[51] Int. Cl.⁶ ..................................................... G06F 7/08
[52] U.S. Cl. ............................................... 235/381; 399/1
[58] Field of Search .............................. 235/381; 355/40, 355/200, 202, 204

[56] References Cited

U.S. PATENT DOCUMENTS

| | | | |
|---|---|---|---|
| 4,067,650 | 1/1978 | Spence-Bate | 355/20 |
| 4,167,322 | 9/1979 | Yano et al. | 355/204 |
| 4,767,917 | 8/1988 | Ushikubo | 235/381 |
| 4,778,983 | 10/1988 | Ushikubo | 235/381 |
| 4,780,806 | 10/1988 | Wada et al. | 355/200 |
| 4,853,684 | 8/1989 | Hoppstadter | 235/381 |
| 4,999,672 | 3/1991 | Rice, Jr. et al. | 355/202 |
| 5,051,564 | 9/1991 | Schmidt | 235/381 |
| 5,077,582 | 12/1991 | Kravette et al. | 355/206 |
| 5,084,875 | 1/1992 | Weinberger et al. | 355/205 |
| 5,147,021 | 9/1992 | Maruyama et al. | 235/381 |
| 5,206,488 | 4/1993 | Teicher | 235/380 |
| 5,223,894 | 6/1993 | Ito | 355/203 |
| 5,224,157 | 6/1993 | Yamada et al. | 355/206 |
| 5,291,244 | 3/1994 | Kajiwara et al. | 355/202 |
| 5,352,876 | 10/1994 | Watanabe et al. | 235/381 |
| 5,440,108 | 8/1995 | Tran et al. | 235/381 |
| 5,440,371 | 8/1995 | Okatani | 355/203 |

OTHER PUBLICATIONS

Advertising brochure, Intercard, The Intercard System, "Prepaid cards save time . . . and money", (Oct. 26, 1994), (pp. 4).

Advertising brochure, Debitek, Inc., "Debitek Cash Card System", (p. 15).

*Primary Examiner*—Donald T. Hajec
*Assistant Examiner*—Mark Tremblay
*Attorney, Agent, or Firm*—Ratner & Prestia

[57] ABSTRACT

A vending control system and method for interfacing a control device to a vending machine having input/output control lines along which are transmitted control signals for controlling the operation of the vending machine. The control device includes, means for connecting to the control lines of the vending machine, means for reading the control signal, means for determining operational responses/outputs of the vending machine which correspond to the control signals, means for storing the control signals and information concerning the operational responses and means for reading the stored information to control the vending machine. Control and monitoring of vending transactions comprises means for reading magnetically stored information from a magnetic card, means for obtaining an authorization amount for a transaction, means for storing the authorization amount, means for operating the vending machine without exceeding the authorization amount and means for storing transaction information.

9 Claims, 14 Drawing Sheets

280

CREDIT CARD AND BANK ISSUED DEBIT CARD OPERATED SYSTEM AND METHOD FOR CONTROLLING AND MONITORING ACCESS OF COMPUTER AND COPY EQUIPMENT

FIELD OF THE INVENTION

The present invention relates to automated dispensing equipment which dispenses products or services (hereinafter collectively referred to as vending mechanics and more particularly to copy machines and computers which can be used on an as needed basis and operated by a user without an attendant.

BACKGROUND OF THE INVENTION

Credit and bank issued debit cards have been in wide spread use in business establishments. The majority of uses of these cards are referred to as attended uses. Personnel of the business establishment, or attendants, are required in order to process and complete a sale or transaction using a credit or bank issued debit card.

In the past, credit card transactions were made by imprinting information stamped on a credit card onto a multi part credit card receipt using a forced-contact device. It was a common business practice to contact a credit card company by telephone to verify the available credit limit on the card to ensure that there was sufficient credit to complete the transaction. If sufficient credit was available, the credit card company and\or credit card processor company provided an authorization number over the telephone which was manually printed onto the credit card receipt.

Magnetic strip technology has largely made the forced-contact devices unnecessary and has allowed for the expansion of credit card and bank issued debit card transactions. Using magnetic strip technology, information concerning a credit card (or bank issued debit card) owner's account is stored as magnetic information on a magnetic strip attached to a credit card or bank issued debit card. By passing the magnetic strip through a magnetic card reader the information about an individual's credit card (or bank issued debit card) account can be read. The information can then be transmitted over telephone lines to the credit card company (or other authorization service) to obtain an authorization for a particular credit card transaction. Imprints of credit card information onto a receipt using a forced-contact device is no longer necessary, as magnetic information is output to a printer which outputs credit card (or bank issued debit card) information (such as the credit card account number or bank issued debit card number) and the transaction information (such as amount, date and store where purchase was made) onto a receipt for the credit card owner.

Various self-service devices using credit cards and bank issued debit cards have been appearing in the marketplace. Automatic Teller Machines (ATMs) have allowed users to deposit, withdraw and transfer funds to and from bank accounts. Originally ATMs were only used with bank issued debit cards. It is now possible to use credit cards for transactions, such as withdrawals, at ATMs (this may be more accurately described as a loan against an available credit line). Neither credit cards or bank issued debit cards contain information about account content. Account content is stored on the computer of a credit card company or bank. This information is accessed with the credit card or bank issued debit card.

In the vending field, credit cards and bank issued debit cards can be used directly at the pumps at self-service gas stations for dispensing gasoline. Although self-service, this type of vend is still referred to as an attended vend (or attended transaction), as an operator must always be on duty at the gas station. Credit cards can also be used on airplanes for personal telephone calls. This use is also considered an attended transaction as flight attendants are available, as well as a telephone operator for assistance, collect calls, information, etc.

Vending machines, such as copy machines, are often used in a completely unattended state. After normal working hours in libraries, office buildings, post office, court houses or copy facilities, users can still operate a copy machine using either coins, cash or private debit cards. Private debit cards are often referred to as "stored value cards" or "prepaid cards" Prepaid cards differ from bank issued debit cards in that prepaid cards have a cash value encoded on the card's magnetic strip. The prepaid card does not require a connection to a database, as do bank issued debit cards and credit cards, to determine if a transaction is within an available credit limit (for a credit card) or within an available balance (for a bank issued debit card). Several problems or inefficiencies can occur, however, with the use of coin/cash operated or prepaid card operated machines.

Coin operated machines require that a user have sufficient change for the number of copies the user is reproducing. The user may not be aware before arriving at the copy facility how many copies are necessary or the cost per copy. Further, for large copy jobs, carrying a sufficient amount of change is burdensome both by the weight and space taken up by the coins and the need to acquire the coins from a bank or other financial institution. This can also pose security problems for a user late at night in a library, for example. Although coin changers are often found in the vicinity of coin operated vending machines, coin changers can also run out of change causing problems during unattended use. There is a lack of accountability, as there is no receipt for transactions.

From an operator's perspective, problems with coin operated vending machines include vandalism, theft, inaccurate counting/reporting, collection and depositing. Prepaid card operated vending machines, such as copy machines, require an inventory of cards (sometimes referred to as "copy cards") as well as equipment to encode the prepaid cards. This requires either an operator to carry out the encoding on the magnetic card (requiring equipment to both read from and write to the card) or a machine analogous to a change machine for dispensing prepaid cards and/or converting cash value to a prepaid card. During unattended use, both of these means for obtaining a prepaid card may be inoperable. In the case of a prepaid card dispensing machine, sufficient change or cash must still be carried by the user. A further problem occurs when a user consumes the available purchasing power on a copy card (the prepaid amount is zero or below the cost of a copy). When this occurs, the user must obtain a new prepaid card or purchase additional purchasing power for the existing card.

Further, generally, both coin and prepaid card operated vending machines do not provide transaction information concerning the type of transaction, location duration, time and other items or information concerning the various transactions. This information can prove useful to the operator of the vending machine.

Over the years, unattended self-service copy vending equipment have been improved with the addition of copier-based features, services and reproduction quality. The improvements for unattended transactions have relied predominantly on third party companies to provide the necessary equipment that would enable the vending machines to accept money and prepaid cards as a method of payment for unattended services (also referred to as "pay as needed" services). With a number of different technologies and a lack of an industry standard, interfaces among the manufacturers of vending machines, even among many inter-company models may not be compatible. This has required different interfaces/wiring schemes for coin mechanisms or different coin mechanisms for attachment to different vending machines. As a result, not all features of a copy machine may be available to a user or separately charged by a copy service provider. For example, a coin operated copy machine typically does not charge a different amount for copying onto larger paper, such as 11"×14" paper or A4 paper.

The coin mechanism's primary function is to accept standard coins and/or make correct change to enable the correct operation of a copy vending machine. Another problem with coin mechanisms is that all transactions must default to the lowest common coin accepted, which is typically a nickel. Although an attended copy machine or prepaid card operated copy machine can change other monetary increments for a transaction, a coin operated vending machine in either attended or unattended states, must default to the lowest common coin accepted by the machine. Hence all pricing increments must be made in multiples of $0.05.

Computer use is an additional area which can be operated as unattended vending. Computer use includes the operation of a computer, access to various on-line services such as databases and bulletin boards, other types of modem communications, scanning of documents and printing. Although not typically referred to as an "on-line service", information stored on compact discs (CDs) can be thought of as similar to on-line services in that a CD contains data stored in a database. Thus, a user's searching can be monitored on a time, per search, per database or per item (does not include per input and/or output) basis. These computer uses would be beneficial to users if made available for users and set up as a pay as needed device to allow cashless unattended use of these services. The type of use may determine the type of associated charge. For example, charges could be based on the amount of time used on the computer or per operation for printing or scanning. For on-line/database searching, there may be surcharges for particular services.

Users of microfilm and microfiche readers would also benefit from a credit card/bank issued debit card operated machine. Like copy machines and computers, microfilm and microfiche readers could then be made available for pay as needed, cashless unattended use.

The same limitations causing coin/cash operation and prepaid card operation problems/inefficiencies which appear in current vending machines would also be present with these computer/microfilm/microfiche uses.

SUMMARY OF THE INVENTION

The present invention comprises a system and method for interfacing a control device to a vending machine having input/output control lines along which are transmitted control signals for controlling the operation of the vending machine. The control device includes, means for connecting to the control lines of the vending machine, means for reading the control signal, means for determining operational responses/outputs of the vending machine which correspond to the control signals, means for storing the control signals and information concerning the operational responses and means for reading the stored information to control the vending machine.

The system and method of the present invention also includes means for determining which operational responses of the vending machine correspond to the control signals by adjusting the time period over which the control signals are read by the control device until the control signals read by the control device correspond to a list of control signals stored in a memory.

The system and method of the present invention also control and monitor transactions on a vending machine and comprise means for reading magnetically stored information from a magnetic card, means for obtaining an authorization amount for a transaction, means for storing the authorization amount, means for operating the vending machine without exceeding the authorization amount and means for storing transaction information.

BRIEF DESCRIPTION OF THE FIGURES

The invention will be described by way of non-limiting example, with reference to the attached drawings in which.

DETAILED DESCRIPTION OF THE INVENTION

Figure 1:
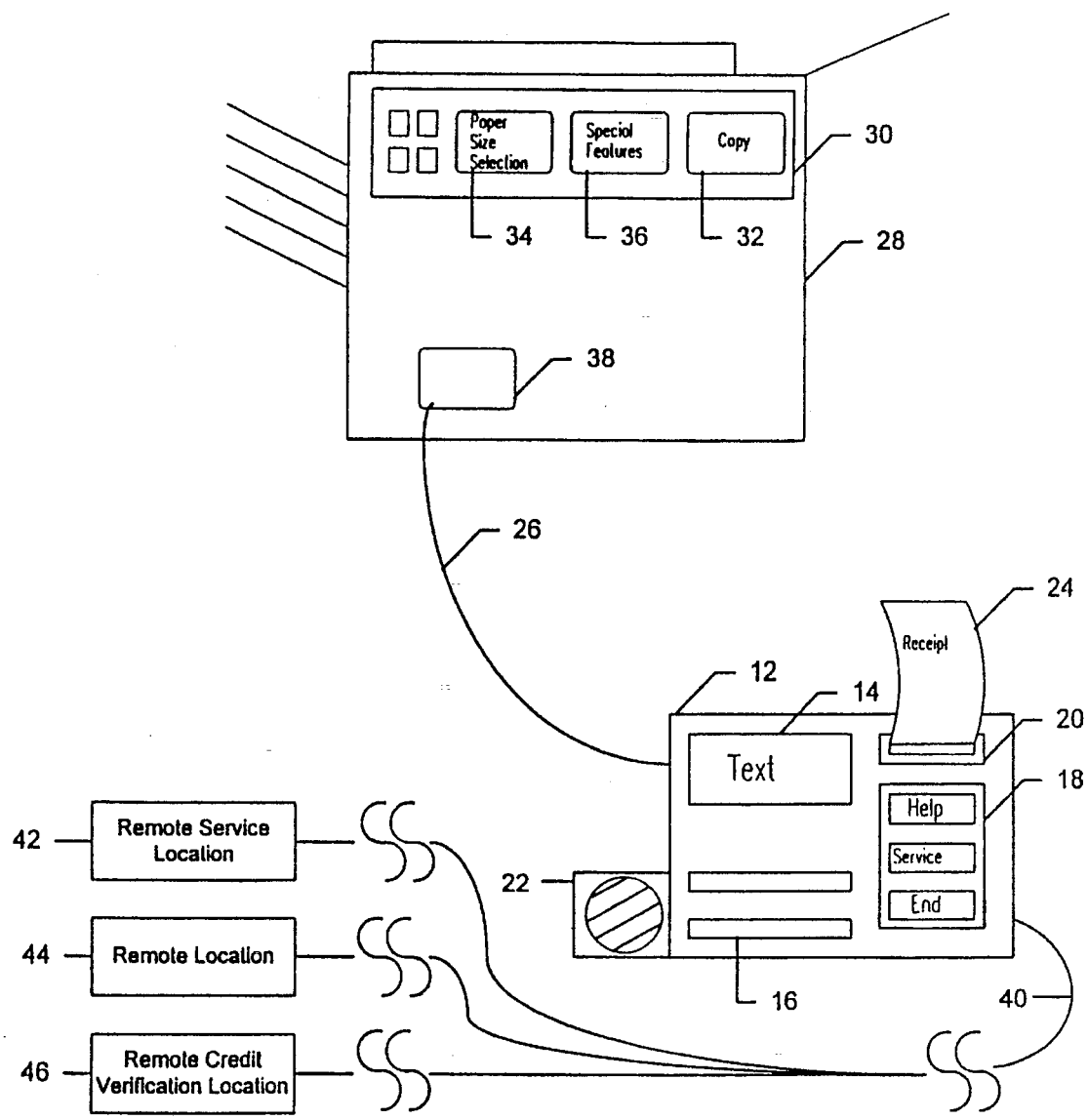
FIG. 1 shows a diagram of the present invention controlling a copy machine and interfacing with remote locations.

There is shown in FIG. 1 a system 10, which is an exemplary embodiment of the present invention. System 10 has a copy machine 28 as an example of a vending machine under control by vending machine control system (controller) 12. Other types of vending machines and computer operated devices for on-line searching, database searching or printing may be used as a vending machine instead of copy machine 28.

Copy machine 28 has a control panel 30 where various copy commands can be executed by the user. Copy button 32 is depressed for copying a document. Many commercial copy machines used for unattended, fee-based copying are only used for making single copies on one size paper. It is possible, however, that other copy functions can be selected such as choosing different paper sizes with paper size selection button 34 or other special features such as reductions and enlargements using special features button 36. With the present invention, additional copy features can be tracked and charged at different rates, if appropriate connections are made between copy machine 28 and controller 12 and appropriate programming of controller 12 is provided.

Copy machine 28 also has a control connection means 38, which may be one half of a connector plug for meeting with a complimentary connector plug. Control connection means 38 is connection point at copy machine 28, designed to allow for fee-based vending of copies. Many console or full size copy machines come equipped for the addition of equipment to convert a non-fee based copy machine to fee-based copying. On these models, it is only necessary to obtain the necessary complimentary connector plug to fit this connector. The removal or addition of a wire harness may be involved to provide for mounting the connector plug. On devices other than copy machines, such as a microfilm or microfiche reader, it will be necessary to make an appropriate connection to monitor, interrupt and control the device. In the case of a microfilm reader this could involve taking control of a print button by placing a second switch (controlled by controller 12) in series with the user operated print button. To allow a "print", both switches must be closed. In the case of a computer for on-line access, this could be a connection to provide a keyboard interrupt so access to the computer cannot take place until an appropriate keyboard control signal is provided.

Copier 28 is connected to controller 12 via electrical connection line 26. Controller 12 contains a text display screen 14 (LCD display screen), a magnetic card reader 16, a keypad 18, a printer 20 (shown with a receipt 24) and a speaker 22. Although shown separate from copier 28, controller 12 can be mounted on or near copier 28 as dictated by the copier service provider. Controller 12 is used to determine an available credit limit for copying (vending) for a given user on copy machine 28, as well as allowing/ disallowing copier use. Alternatively, a bank issued debit card (such as a Money Access Center card, "MAC" card) can be used instead of a credit card. For purposes of this description, "magnetic card" will be the generic designation for a credit card or a bank issued debit card or a smart card.

A magnetic card (not shown) is passed through card reader 16 and the information from the magnetic strip of the magnetic card is read by card reader 16. Certain portions of or all of this magnetic information is transmitted over a communications line 40 to a remote credit verification location 46. Communication line 40 can take the form of a telephone line, dedicated telephone line or cellular communication line. The type of communication line required will depend upon the location and use of a particular vending machine. Appropriate communication hardware for the connection line being used, such as a cellular telephone, will be necessary to establish communication and will be understood by those skilled in the art.

Along with the magnetic card information, a predetermined dollar amount is transmitted to remote credit location 46. For example, a $10 amount may be transmitted, requesting an authorization for copying up to $10. In another embodiment, a user may select the dollar amount for authorization through keyboard 18. A grant or deny signal is then transmitted back over communication line 40 to controller 12 from remote credit verification location 46. Remote credit verification location 46 may be a credit card agency or processor in the case of a credit card, a bank in the case of a bank ATM card or a private organization in the case of a privately provided debit card.

Once controller 12 receives the return signal, controller 12 allows copying up to the authorized amount if a grant signal which authorizes a vend transaction, along with an available credit limit has been provided and refuses copying if a deny signal has been provided. Appropriate instructions to the user are provided by display 14.

Audible information (voice messages) can also be provided via speaker 22. An example of voice message is a reminder, repeated after a given time period, that a copy should be made or the transaction will be terminated. This could help a user from forgetting that there is an authorized credit still left on the machine which could be used by another if the user walks away. The problem of "forgetting" is also addressed by a timeout feature which terminates a transaction if no action is taken within a preset period of time. The allowable time between copies for a given transaction authorization can be set by the copy service provider.

Other audible or graphic messages, including instructions, pricing and advertising, can be provided as set up by the copy service provider.

A keypad 18 is also provided for entering key code information. A keypad with one or more keys can be provided, depending on the type of user input which may be required. In the case of a bank issued debit card, such as an ATM card, a personal identification number (PIN) may be required. In an exemplary embodiment of the past invention three keys are provided—a SERVICE key, a HELP key and an END key.

Controller 12 is shown connected to three types of remote locations through communication line 40. Remote credit verification location 46 has already been discussed. Remote service location 42 may be the same as or separate than remote credit verification location 46. Remote service location 42 receives and sends information concerning the operation of copy machine 28 and controller 12. Information such as additional copy paper or receipt paper required, or malfunctions may be communicated from copy machine 28 and controller 12 to remote service location 42.

Remote service location 42 may transmit a sleep signal or an out-of-order signal if it detects a malfunction in either device. Remote service location 42 may also be used to monitor when equipment is in use. Remote location 44 can also be the same as one or more of the other remote locations. It may have a function of receiving transaction information so that the types of use, rates of use and times of use can be monitored and analyzed to enhance copy service. With this information, deliveries of paper, toner and other supplies may be timed to enhance productivity of the vending machine and those servicing it.

In the embodiment of system 10 shown in FIG. 1, only a credit card reader 16 is shown. An alternate embodiment may use a coin mechanism or bill acceptor mechanism or prepaid card to pay for the copy vending. In such an embodiment, the transaction tracking and service capabilities of the present invention are still provided.

When a user has completed all of the user's copying, the number of transactions and cost per transaction are stored in a memory device of controller 12. This information, along with a predetermined transaction/cost information with other users will be settled by batch processing at a later time. The predetermined number of transactions may be related to the amount of memory, or requirements of the credit card company/processor (such as every 100 transactions). The batch settlement can also be related to a time period or combination of time period and number of transactions. Batch processing of transaction information is an efficient use of time, as a separate call is not required after every user's copying is complete. The operation of batch processing is discussed in more detail below. In an exemplary embodiment, batch settlement occurs daily.

Although not illustrated in system 10 shown in FIG. 1, it also possible to have multiple vending machines, such copy machines 28, attached to a single controller 12.

Figure 2:
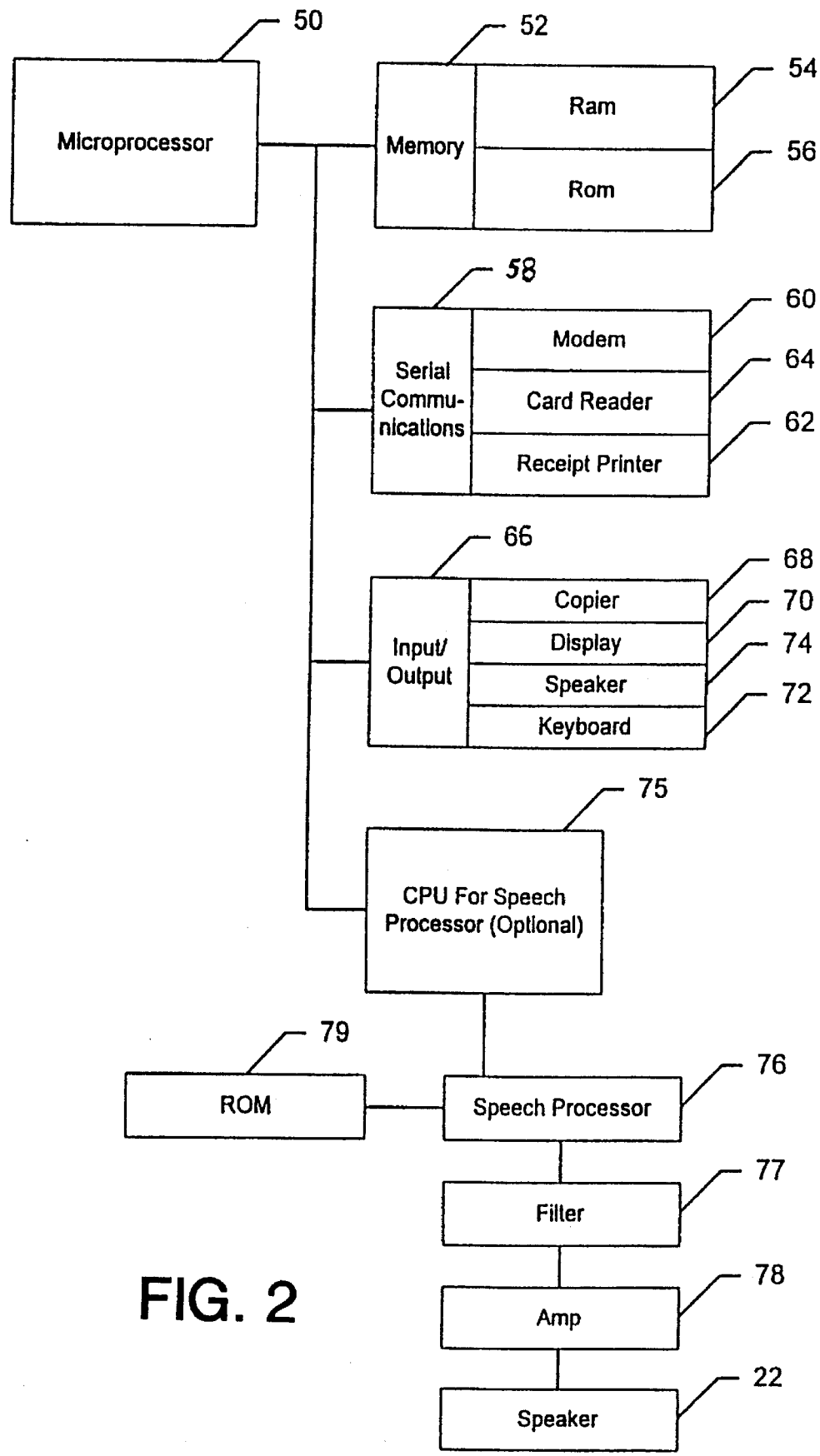
FIG. 2 shows a block schematic diagram of the operational aspects of the present invention.

There is shown in FIG. 2 a block schematic diagram of the logic and communications circuits contained within controller 12.

Controller 12 contains a microprocessor 50 such as the Z0868108PSC by Zilog. Microprocessor 50 controls the input output (I/O) and memory functions of controller 12. Microprocessor 50 has a memory 52 for storing program information as well as transaction information. Memory 52 is shown consisting of a Read Only Memory (ROM) 54 and a Random Access Memory (RAM) 56. An example RAM is the DS1486 manufactured by Dallas Semiconductor. An example ROM is the 27C256-12/P by Microchip. This ROM chip is a 256K ROM. Microprocessor 50 may also be controlled by an instruction set stored in an Electrically Erasable Read Only Memory (EEROM) such as the 93C56-P serial EEROM also made by Microchip. Other types of memory including removable memory such as disks or removable cards may be used and will be understood by those skilled in the art.

Microprocessor 50 controls input and output through serial communications block 58 and I/O block 66.

Serial communication block 58 encompasses a communication section 60 for communicating with a modem (not shown); a communication block 64 for communicating with a card reader such as card reader 16; and a communication port for communication with a receipt printer such as receipt printer 20. In an exemplary embodiment, the on board modem used for communicating with remote locations is the CH17185 PCB mount modem 2400 by Cermetek. This modem provides communication at 2400 baud. Controller 12 also contains a 6252SA/6250SA by Xico as card reader 16 and a receipt printer 20 made by Citizen. Serial communication ports are commonly referred to as "COM" ports. Thus, communications ports 60, 62 and 64 may be referred to as COM1, COM2 and COM3 respectively. The necessary circuitry and print out connectors for the modem, card reading and receipt printing functions are well known. In an exemplary embodiment of the present invention, and RS232 output is provided by the ADM235LJN integrated circuit by Analog Devices.

Controller 12 also has an optional speech processor 76. Speech processor 76 provides synthesized speech as a source of output through speaker 22. In this way, text information can be provided audibly as well as graphically. Speech is provided through the MSM6295GSK speech controller manufactured by OKI. Whether or not speech processors are provided to the user is optional. This feature can also be remotely activated and modified from a remote location such as remote service location 42. If speech is provided, a volume control mechanism and appropriate amplification and preamplification may be provided.

Speech processor 76 is operated by receiving a control signal from CPU 75. CPU 75 is a Microchip PIC16C54-H-HS/P. CPU 75 receives enabling and menu selection data from microprocessor 50. Based on the enabling and menu data received from microprocessor 50 CPU 77 starts speech processor 76. CPU 70 provides speech processor 76 with control signals and instruct speech processor 76 to play particular prerecorded message accessed from memory 79. Memory 79 is a ROM in an exemplary embodiment of the present invention. Memory 79 contains all of the prerecorded speech data used by speech processor 76. Speech data from memory 79 is converted to an analog signal via digital to analog convertor in speech processor 76. The convertor analog signal is fed to low pass filter network 80. Low pass filter 80 has a corner frequency of 4 khz in an exemplary embodiment of the present invention. The filtered signal is fed from 80 to audio amplifier 78. Audio amplifier is a Sanyo LA4460 in an exemplary embodiment of the present invention. Finally, the amplified analog signal is passed to speaker 22. An additional embodiment of the present invention an additional speaker is provided for non-speech output such as "BEEP" tones.

Controller 12 can be used to interface with a vending machine, such as a console copy machine 28 by identifying the pulse widths of a copy enable signal. For example on the Minolta EP 1080 the Omron relay is inactive (off) and the output monitoring line is inactive (+24 volts) prior to a vend (copy) taking place. The transition from a low signal (0 volts) to a high signal (24 volts) is counted as one copy. Controller 12 monitors the line activity (in this case voltages) over a period of time. When the readings during this monitoring period agree with the transaction that is being requested, controller 12 stores the signal information in memory.

If the readings do not agree with the transaction that is being requested, the time period over which the control signal is monitored is increased or reduces a predetermined increment and a new reading is taken place and compared to the transaction being requested. This process is repeated until agreement between the readings and the desired transaction is achieved.

In an exemplary embodiment, an operator works interactively with controller 12, requesting a particular transaction (such as a single 8½"×11" copy) and indicating to controller 12 through keypad 18 whether the reading of controller 12 (as shown through display 14) agrees with the requested transaction.

Figure 3A:
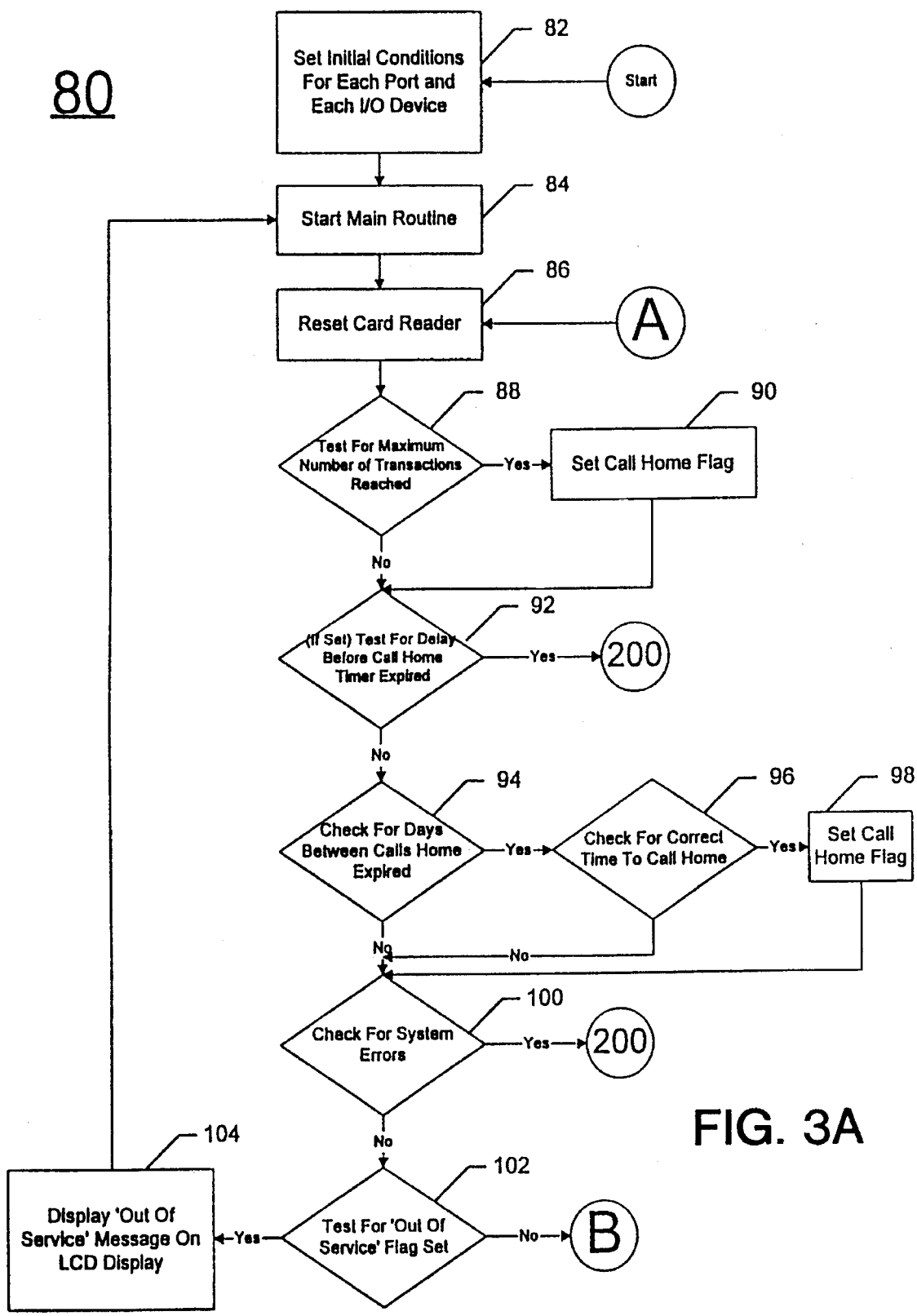
FIGS. 3A and 3B show a flow diagram illustrating the operation of a main routine while awaiting credit card input in accordance with the present invention.
Figure 3B:
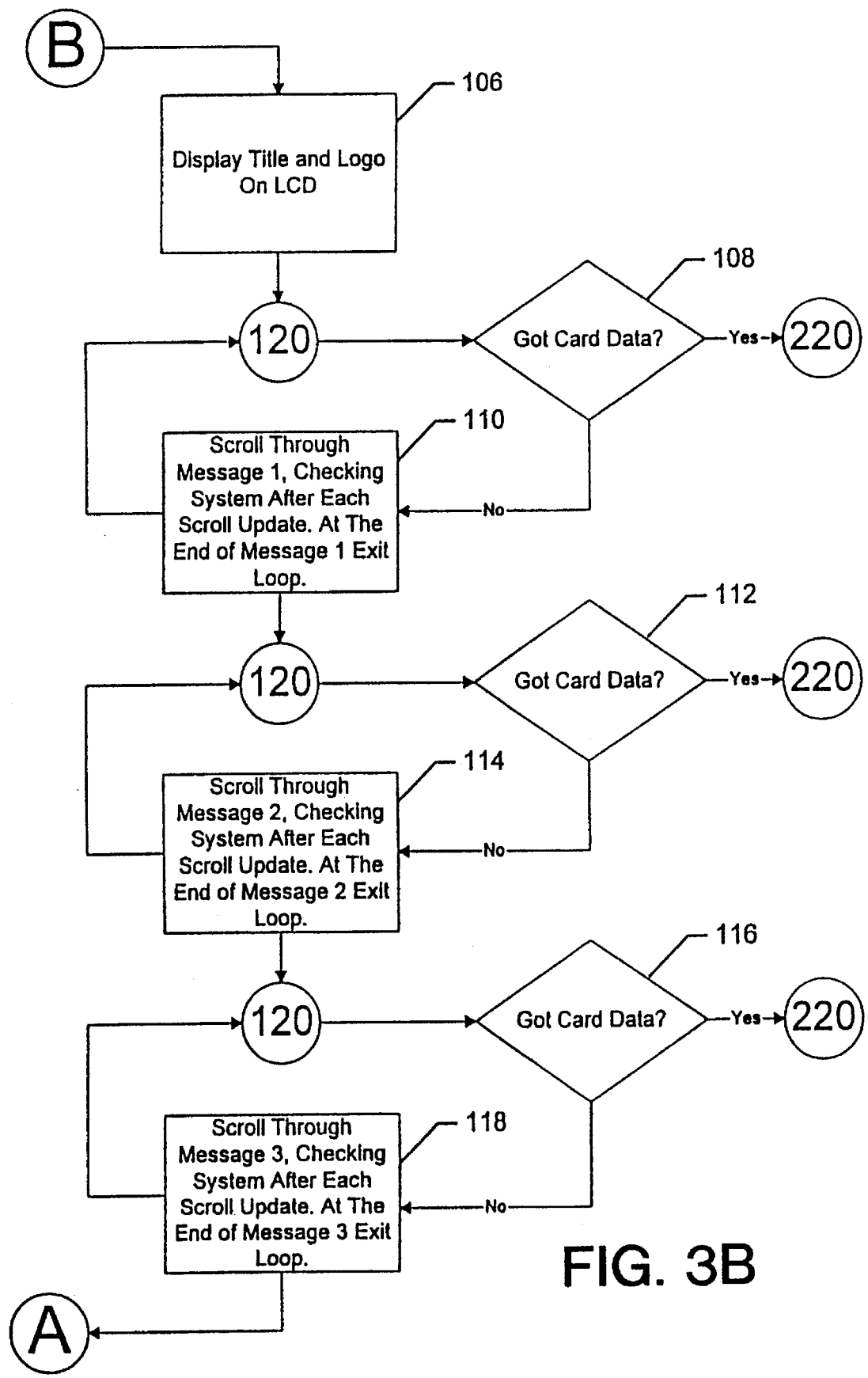

There is shown in FIGS. 3A and 3B flow diagrams showing a main routine which checks for system errors, and whether it is time to communicate with a remote location, while waiting for a user to pass a magnetic card through magnetic card reader 16 (or deposit coins or currency if another type of payment means is provided).

Processing begins by entering block 82 where initial conditions for each output port and each input/output device are set. As previously described, the exemplary embodiment of the present invention uses serial ports for serially communicating with peripheral devices.

Processing then continues to block 84 where the main routine is started. In block 86 magnetic card reader 16 is reset. In block 88 a test takes place to determine whether the maximum number of transactions has been reached.

As the exemplary embodiment of the present invention processes transactions as a batch, it has a maximum number of transactions (based on the RAM size) which can be stored in its memory. Accordingly, when a predetermined maximum number of transaction is reached, controller 12 will not take anymore magnetic card inputs and will prepare to forward the multiple transaction information as a batch job over communication line 40 to a remote location.

Figure 8:
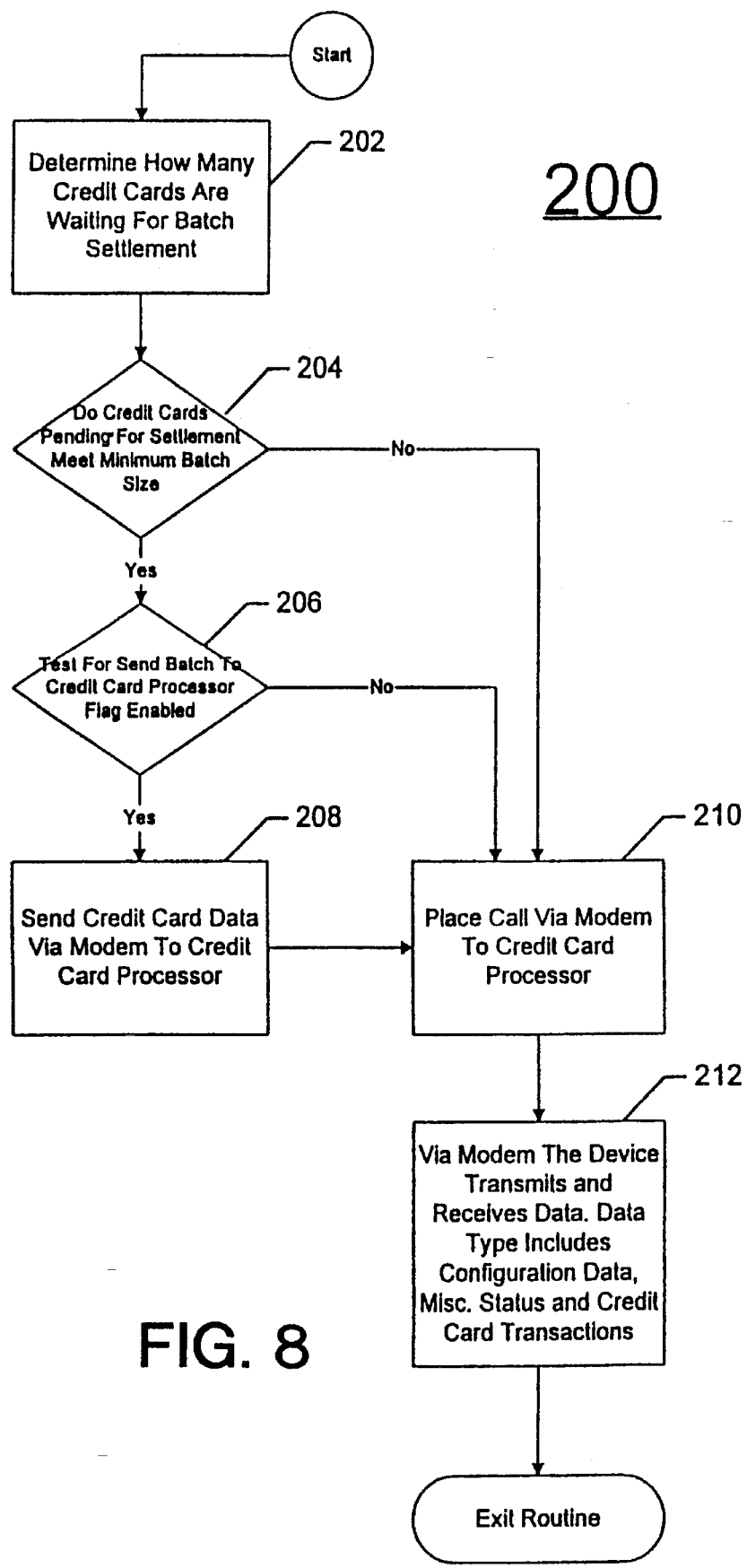
FIG. 8 is a flow diagram showing a routine for sending batched transaction(s) information in accordance with the present invention.

If the determination in block 88 is yes, processing goes to block 90 where the call home flag is set. The call home flag designates that it is time to call the remote location for batch processing. If the maximum number of transactions is not reached, processing moves to block 92 where it is determined if the call home flag has been set. If the flag has been set, a test is conducted to determine whether there has been a delay before the call home timer has expired. The call home flag can be set at any time in which system 10 is in operation. Controller 12 waits to place a call to a designated remote location ("home"), however, until a predetermined period of inactivity occurs. When the period of inactivity is exceeded, the call is placed. Other variables may be used to determine when to make a call. If the call home flag has been set, processing moves to system subroutine 200 which is shown in FIG. 8. If the call home flag has not been set, processing continues to block 94, where a determination is made as to whether a predetermined number of days between calls to the remote location has expired. If the predetermined number of days between calls to the remote location has expired, processing moves to block 96 where the correct time to call the remote location is checked.

If it is presently an allowable time to call the remote location, the call home flag is set in block 98 (the call home flag is cleared after a successful call is made). Processing then moves to block 100 (also on a negative condition from the determination made in blocks 94 and 96) where a check for certain system errors takes place. Examples of some system errors include printer out of paper, memory full and copier problems. If a system error has occurred, processing again moves to the system subroutine 200 shown in FIG. 8. If no system errors have occurred, processing continues to block 102 where a test is made to determine whether the out of service flag has been set. If the out of service flag has been set, processing moves to block 104 where an out of service message is displayed on display 14. Processing then moves back to block 84 and the main routine is once again started.

If the determination in block 102 is negative, processing moves to block 106 shown in FIG. 3B. In block 106 a title and logo are displayed on display 14. The title and logo are stored in one of the ROMs as ASCII characters to provide text and/or images. Processing next moves to Check System subroutine 120 shown in FIG. 4 to check the system. After returning from Check System Subroutine 120, processing moves to block 108 where it is determined whether card data has been obtained, from magnetic card reader 16. If magnetic card data has been obtained processing moves to Transaction Subroutine 20 to process the transaction. If no magnetic card data has been obtained, processing continues to block 110 where a first message is displayed on LCD display 14. In an exemplary embodiment, Message 1 provides identification information: Line 1—"CREDIT CARD COPY EXPRESS™"; Line 2—"USA ENTERTAINMENT CENTER, INC.".

While the first message is being displayed, a loop through check system subroutine 120 and determination block 108 and block 110 continues. A similar routine begins as processing move towards block 112 and block 114. Here, a second message is displayed on display 14. The second message provides operation information for the user: Line 1—"PRESS HELP"; Line 2—"FOR INSTRUCTIONS PRESS HELP." Processing continues to loop through Check System Subroutine 120 and determination block 112 and message display block 114 until the entire text of the second message has been displayed.

A similar process takes place as processing moves to block 116 and display block 118. Here, a third message is displayed. The third message provides instructions for using a magnetic card: Line 1—"SWIPE CARD"; Line 2—"TO MAKE COPIES, SWIPE A VALID CREDIT CARD". and the processing loop consisting of Check System Subroutine 120, determination block 116 and message three display block 118 is carried out. If no magnetic card date is determined in block 116 and message three has completed its display in block 118, processing returns to block 86 shown in FIG. 3A.

Figure 4:
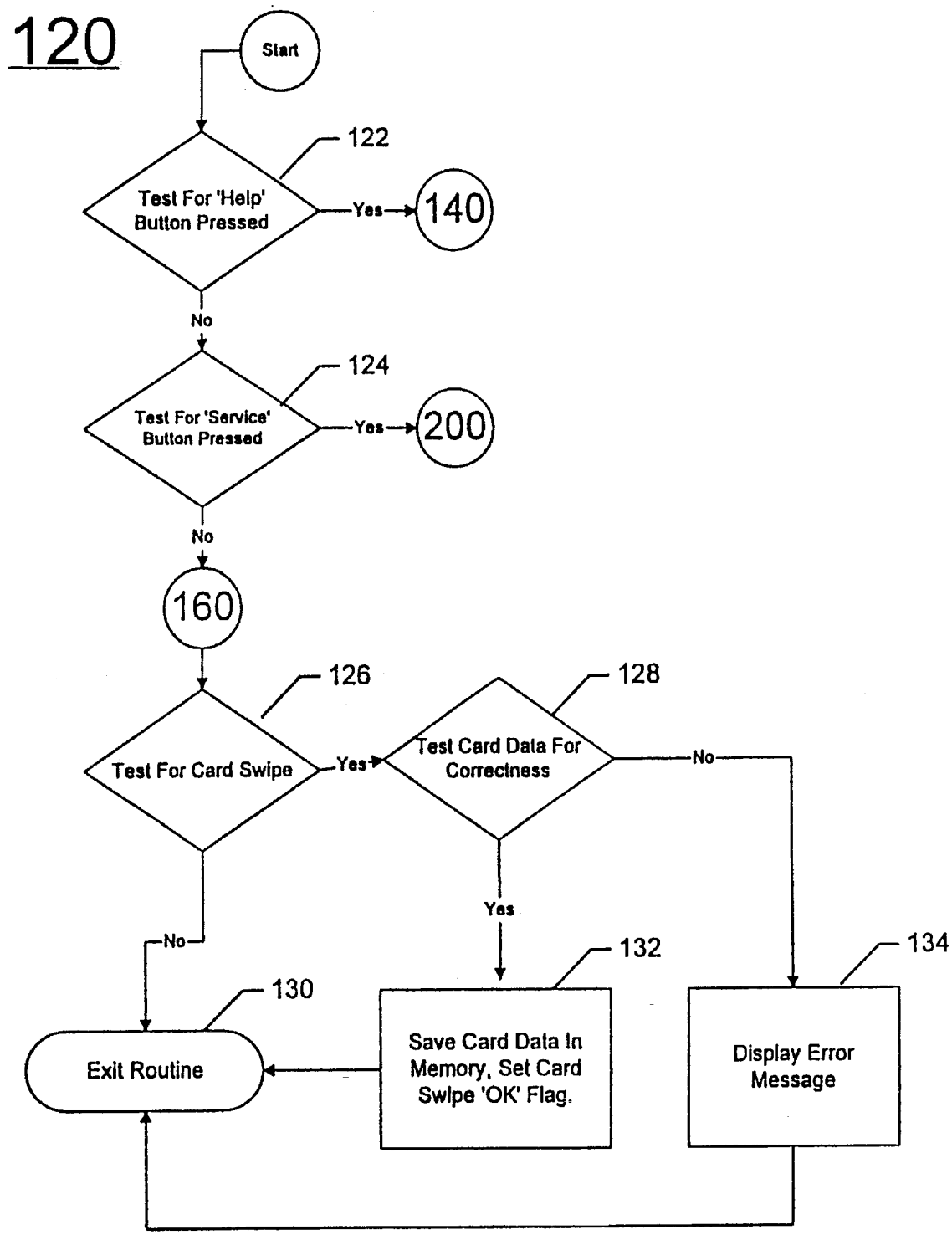
FIG. 4 is a flow diagram showing a subroutine for checking a system of the present invention.

There is shown in FIG. 4 a flow diagram of the Check System Subroutine. Processing begins by entering block 122 where a determination is made whether the HELP button has been depressed. If the HELP button has been depressed, processing moves to the HELP Message Subroutine 140 shown in FIG. 5. If the HELP button has not been depressed, processing moves to block 124 where it is determined whether the SERVICE button has been depressed. If the SERVICE button has been depressed, processing moves to System Service Subroutine 170 shown in FIG. 7. If the SERVICE button has not been depressed, processing moves to flow diagram 160 shown in FIG. 6 to determine whether a magnetic card has passed through magnetic card reader 16.

In block 126 it is determined whether a magnetic card has passed through magnetic card reader 16. If yes, processing moves to block 128 where the correctness of the magnetic card data is tested. If the data is acceptable, processing is moved to block 132 where the magnetic card data is saved in memory and the card read flag is set. If the card data is not acceptable, processing moves to block 134 where an error message is displayed on display 14. Following the display of the error message, the routine is exited.

Figure 5:
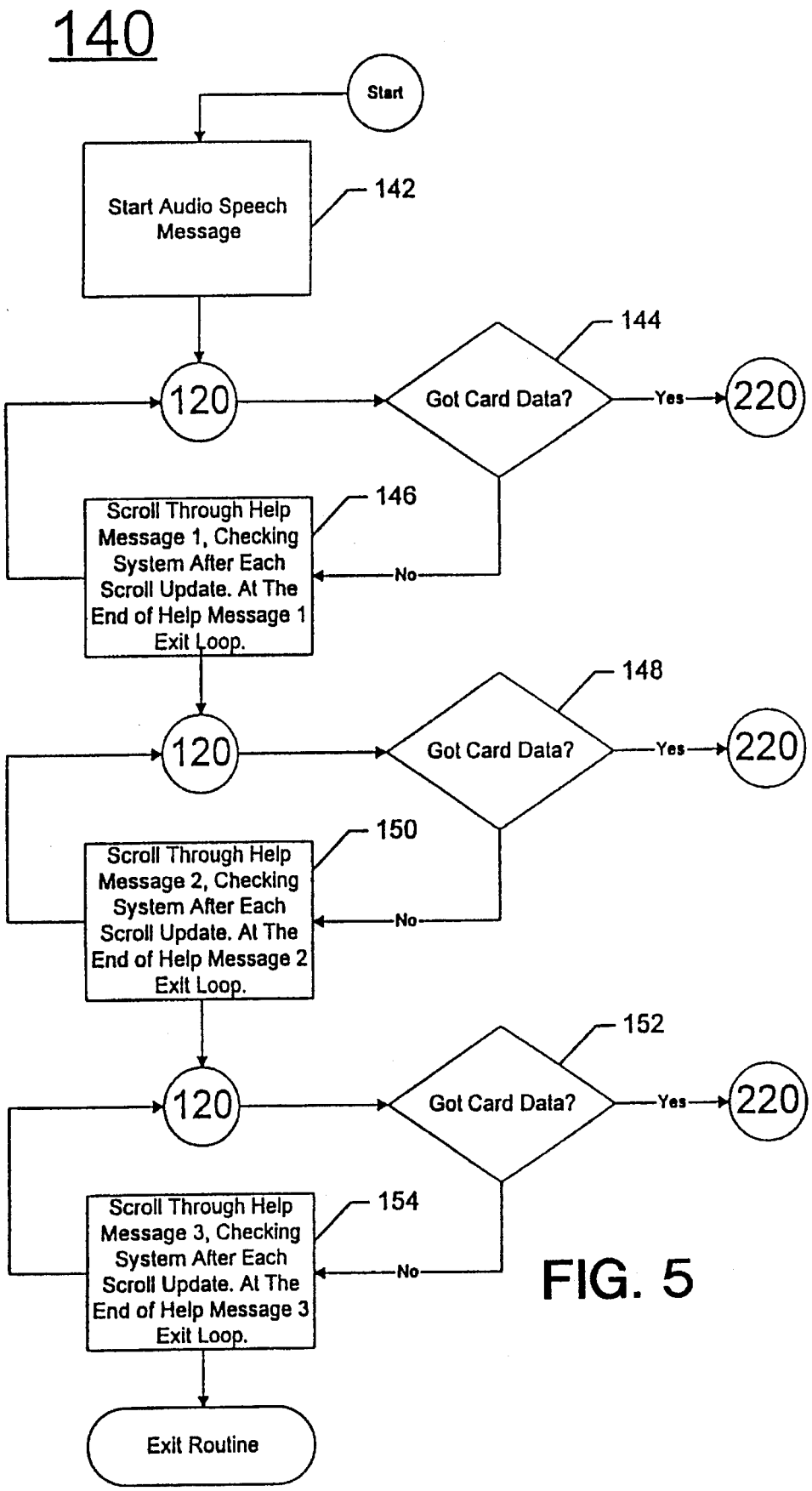
FIG. 5 is a flow diagram showing a help message subroutine used in accordance with the present invention.

There shown in FIG. 5, Help Message Subroutine 140. In an exemplary embodiment, this routine plays a prerecorded audio (voice) message when called. It also cycles through three informative help messages. Either completing the three messages or detection of a magnetic card in magnetic card reader 16 forces an exit out of Help Message Subroutine 140. Pressing a HELP button in keypad 18 will start this routine from the beginning.

Help Message Subroutine 140 begins by entering block 142 where the audio speech message is started. Audio speech is an option which can be selected by the copy service provider. It can also be provided or set from remote location. Processing next enters Check System Subroutine 120 shown in FIG. 4. Processing then moves to decision block 144 where it is determined whether a magnetic card has been passed through magnetic card reader 16. If a magnetic card is detected, processing moves to Transaction Subroutine 220 shown in FIGS. 9A and 9B. If a magnetic card has not been detected, processing moves to block 146 where the first help message is displayed. Processing continues to loop through Check System Subroutine 120, determination block 144 and message display block 146 until either a magnetic card is detected or the first message has been fully displayed. Processing then moves back to Check System Subroutine 120 and then to decision block 148. Similar to the Check System Subroutine 120, decision block 144 and display block 146 loop above, a similar loop takes place through Check System Subroutine 120, decision block 148 and display block 150 with respect to the second message. Finally, a third message loop consisting of Check System Subroutine 120, decision block 152 and message display block 154 takes place. If by the end of the third message a magnetic card is not detected, the subroutine is exited.

In an exemplary embodiment of the present invention, the following HELP messages are provided.

| Message 1: | Line 1: - | "SWIPE CARD" |
| | Line 2: - | "SWIPE CREDIT CARD FROM RIGHT TO LEFT, MAGNETIC STRIPE FORWARD" |
| Message 2: | Line 1: - | "MAKE COPIES" |
| | Line 2: - | "UPON RECEIVING AUTHORIZATION, MAKE ALL YOUR COPIES" |
| Message 3: | Line 1: - | "PRESS END" |
| | | "TO END COPYING, PRESS 'END' AND TAKE RECEIPT". |

Figure 6:
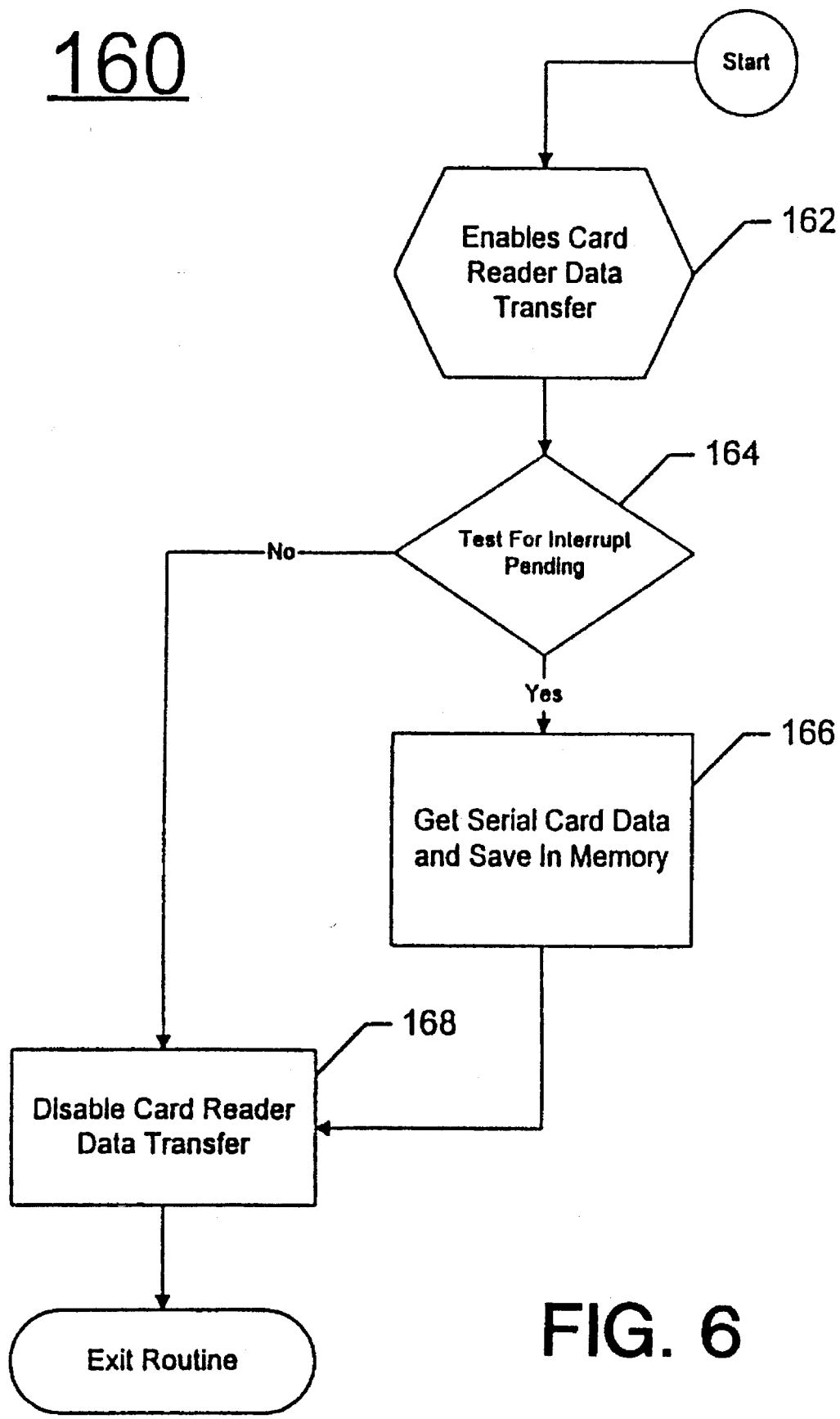
FIG. 6 is a flow diagram showing a card reader interrupt subroutine in accordance with the present invention.

There is shown in FIG. 6 a flow diagram of Magnetic Card Detection Subroutine 160. This routine polls card reader 16 for an interrupt signal. If an interrupt signal is detected, data is transferred from magnetic card reader 16 to microprocessor 50. In an exemplary embodiment, a serial data link between magnetic card reader 16 and microprocessor 50 is used. This data is held in a scratch pad RAM buffer such as RAM 56.

This routine begins by entering block 162 where the magnetic card reader 16 data transfers are enabled. In block 164 a test in undertaken to determine if an interrupt is pending. If an interrupt is pending, processing moves to block 166 where magnetic card data is obtained via a serial data link 64 and saved in RAM memory 56. Processing then moves to block 168 where the data transfer from magnetic card reader 16 is disabled. When complete, this routine is exited.

Figure 7:
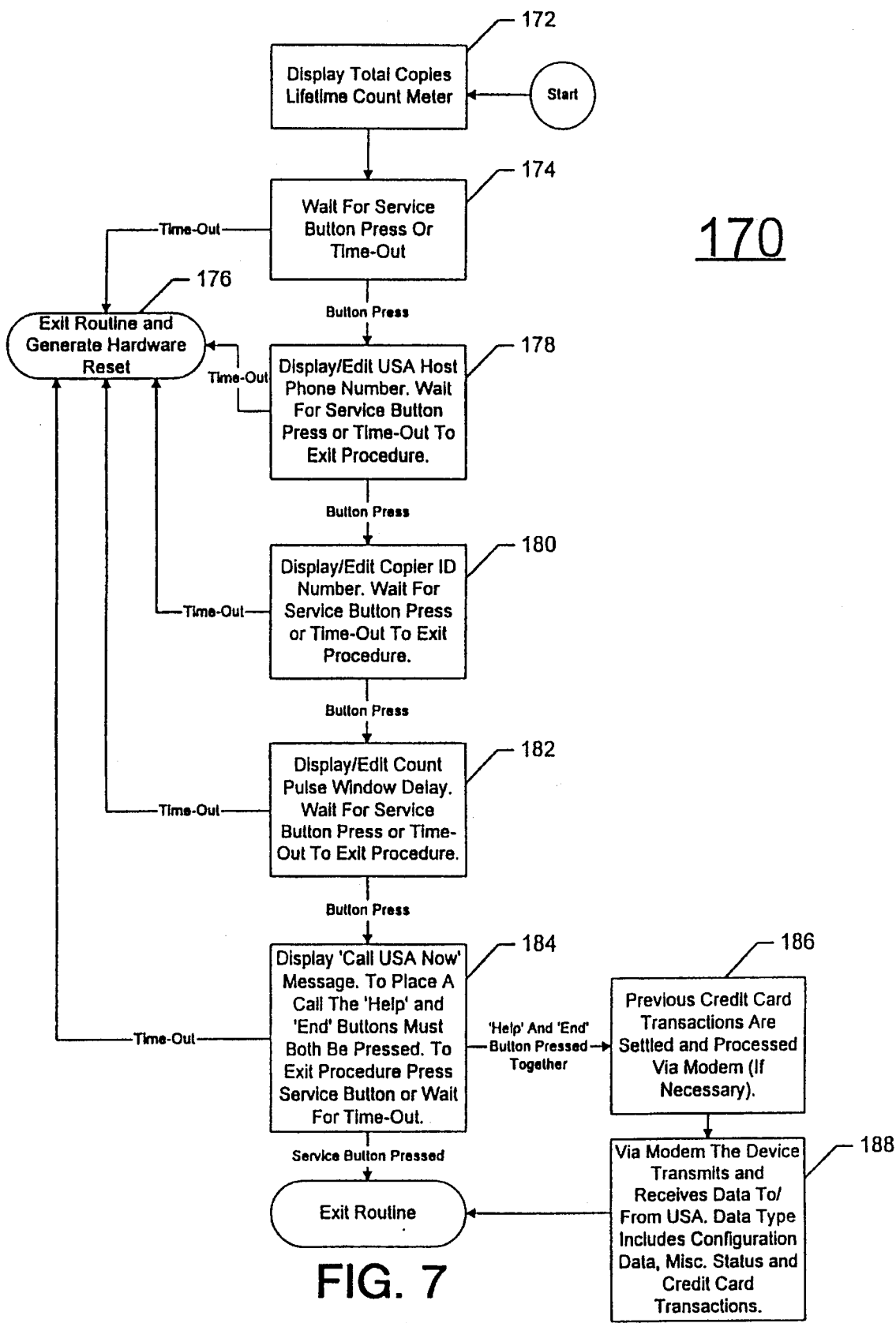
FIG. 7 is a flow diagram showing a service subroutine for monitoring system performance and editing system operational parameters in accordance with the present invention.

There is shown in FIG. 7, Service Subroutine 170. The routine allows a user to view and change various service related fields. These fields may include the cumulative total of copies which have been made on the device (such as copier 28), the phone number(s) of remote location(s), controller 12/copier 28 ID number(s) and pulse delay number and other fields tailored to specific site equipment and conditions. The edit process involves using the HELP and END button located on keypad 18 to change the field information and move a cursor displayed on LCD display 14.

Processing begins by entering block 172 where the total number of copies made on copy machine 28 are displayed. Processing then continues to block 174 where a delay is effectuated until a SERVICE button is pressed or a time-out occurs. If a time-out occurs, the routine is exited and a hardware reset is generated in block 176. If the service button is pressed, processing moves to block 180 where a remote location phone number is displayed. If a time-out occurs, the routine is exited and a hardware reset is generated. If a service button is pressed, processing moves to block 182 where the copier ID number is displayed. At this time, the service operator can also edit the copier ID number. If a time-out occurs, processing moves to block 176 where the routine is exited. If the service button is pressed, processing moves to block 184 where the pulse window delay count is displayed. The service operator can also edit the pulse window delay count at this time. Again, if a time-out occurs, processing moves to block 176 where the routine is exited. If the service button is pressed, processing moves to block 186 where the call remote operator message is displayed. In an exemplary embodiment, a remote operator can be called by pressing the HELP and END buttons simultaneously. After block 186, processing moves to block 188 where the previous credit card transactions are settled and processed via modem if necessary. From block 190, Service Subroutine 170 is exited.

There is shown in FIG. 8 System Service Subroutine 200. This routine send 100% of the transactions data stored in memory. If a predetermined amount of credit card transactions require settlement, and controller 12 is configured to batch process transaction settlement data directly to a particular remote location (such as remote location 44), batch processing is accomplished first. Following the batch processing, a call is placed to remote service location 42. In an exemplary embodiment, a predetermined minimum amount of credit card transactions is used in the determination.

Processing begins by entering block 202 where a determination of how many credit card transactions are pending settlement. Processing then moves to block 204 where it is determined whether the amount of batch transactions waiting for settlement meet a predetermined batch size (such as a minimum batch size). If predetermined minimum batch size is not met, processing moves to block 210 where a call is made to remote service location 42. If the determination made in block 204 is yes, processing moves to block 206 where it is determined whether a flag has been enabled for sending the batch transaction settlement data. If the flag has not been set, processing moves to block 210 and a call is placed directly to remote service location 42. If the flag has been enabled processing moves to block 208 and the transaction settlement data is sent via modem to a remote location 44. Processing then moves to block 210. Following block 210, processing moves to block 212 where controller 12 transmits and receives data including configuration data, miscellaneous status and credit card transaction information via modem to remote service location 42.

Figure 9A:
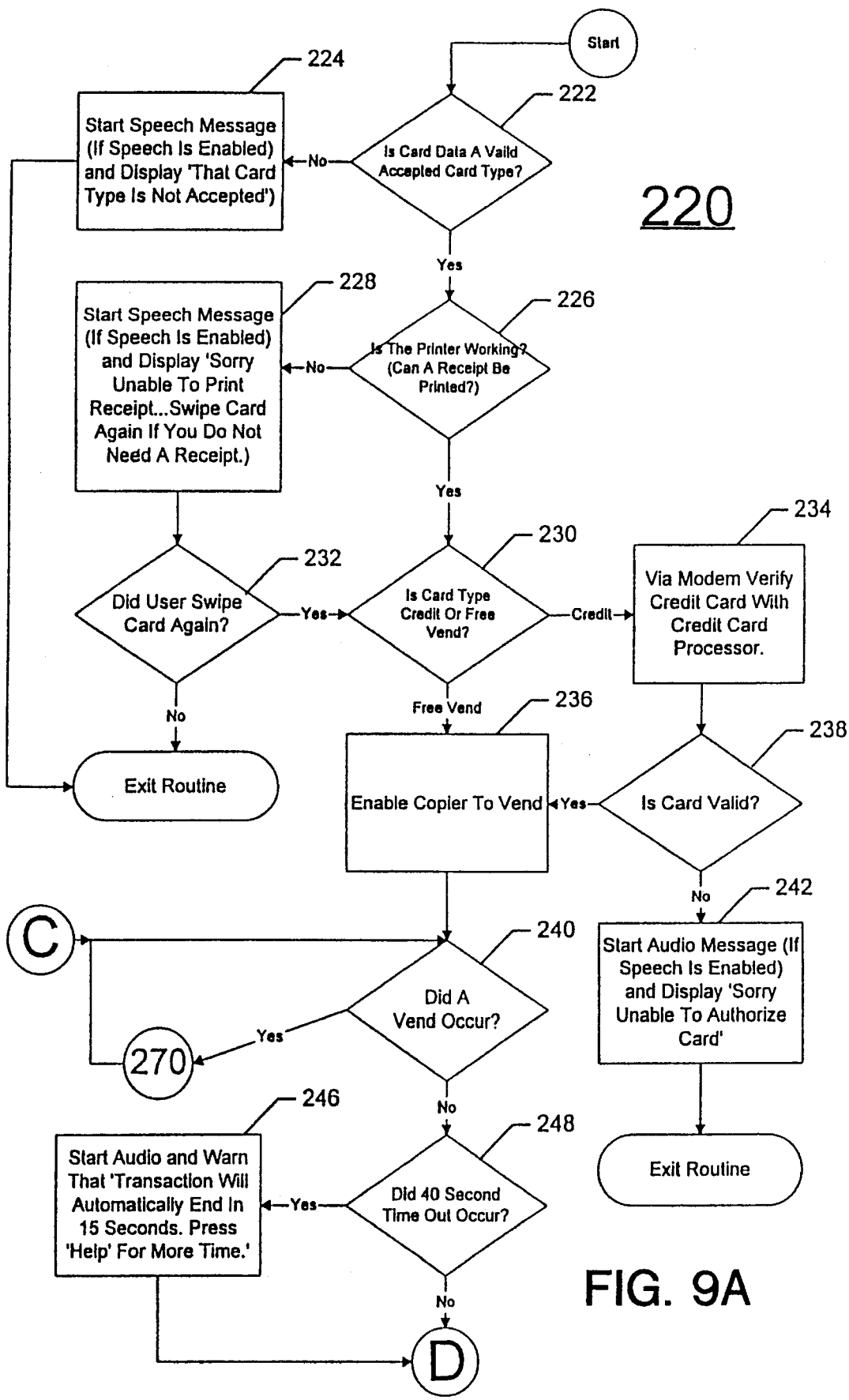
FIGS. 9A and 9B are flow diagrams showing a transaction subroutine in accordance with the present invention.

There is shown in FIG. 9A Transaction Subroutine 220. This routine processes the magnetic card data. It also enables/disables a copier 28 for vending as required and terminates a transaction by updating memory variables and printing a receipt 24 on receipt printer 20.

Transaction Subroutine 220 begins by entering decision block 222 where it is determined whether a magnetic card read on magnetic card reader 16 is a valid accepted card type. If not, a message—"THAT CARD TYPE IS NOT ACCEPTED", is displayed on display 14. If the speech option is being used, the message is also played through speaker 22. Transaction subroutine 220 is then exited. If a valid card type is detected, processing moves to block 226 where it is determined whether receipt printer 20 is operating. If not, the message—"SORRY UNABLE TO PRINT RECEIPT SWIPE CARD AGAIN IF YOU DO NOT NEED A RECEIPT", is displayed on display 14. If the speech option is being used, the message is also played from speaker 22.

From block 228, processing moves to block 232 where it is determined whether the user passed a magnetic card through magnetic card reader 16. If no card is detected, Transaction Subroutine 220 is exited. If the magnetic card is detected, processing moves to block 230. Processing also moves to block 230 following a positive determination regarding operation of receipt printer 20. In block 230 it is determined whether a credit card or free vend card was read. If a credit card was read, a credit card verification takes place by contacting remote credit verification service 46 over a communication line 40. In block 238 it is determined whether the card is valid. This entails receiving an authorization signal from remote credit verification service 46. If a free vend card number was detected in block 230, processing moves to block 236. If a valid card is not determined in block 238, processing moves to block 242 where a message—"SORRY UNABLE TO AUTHORIZE CARD", is displayed on display 14. If the speech option is being used, this message is also output on speaker 22. Following block 242 Transaction Subroutine 220 is exited. If a valid card is detected in block 238, copier 28 is enabled in block 236.

Processing then moves to block 240 where it is determined whether a vend (copy) occurred. If yes, processing moves to Vend Copy Subroutine 270 and back to block 240. If a vend did not occur, processing moves to block 248 where it is determined whether a predetermined time-out has occurred. In an exemplary embodiment, a 40second time period is used as the predetermined amount of time. If a 40-second time-out has not occurred, processing moves to block 251 in FIG. 9B. If a 40-second time-out has occurred, processing moves to block 246 and a message—"YOUR TRANSACTION WILL AUTOMATICALLY END IN 15 SECONDS PRESS 'END' TO END YOUR TRANSACTION NOW PRESS 'HELP' FROM MORE TIME" is displayed on display 14. If the speech option is being used, the message is output through speaker 22. This is an audible reminder so that a user does not leave an enabled vending machine active.

Figure 9B:
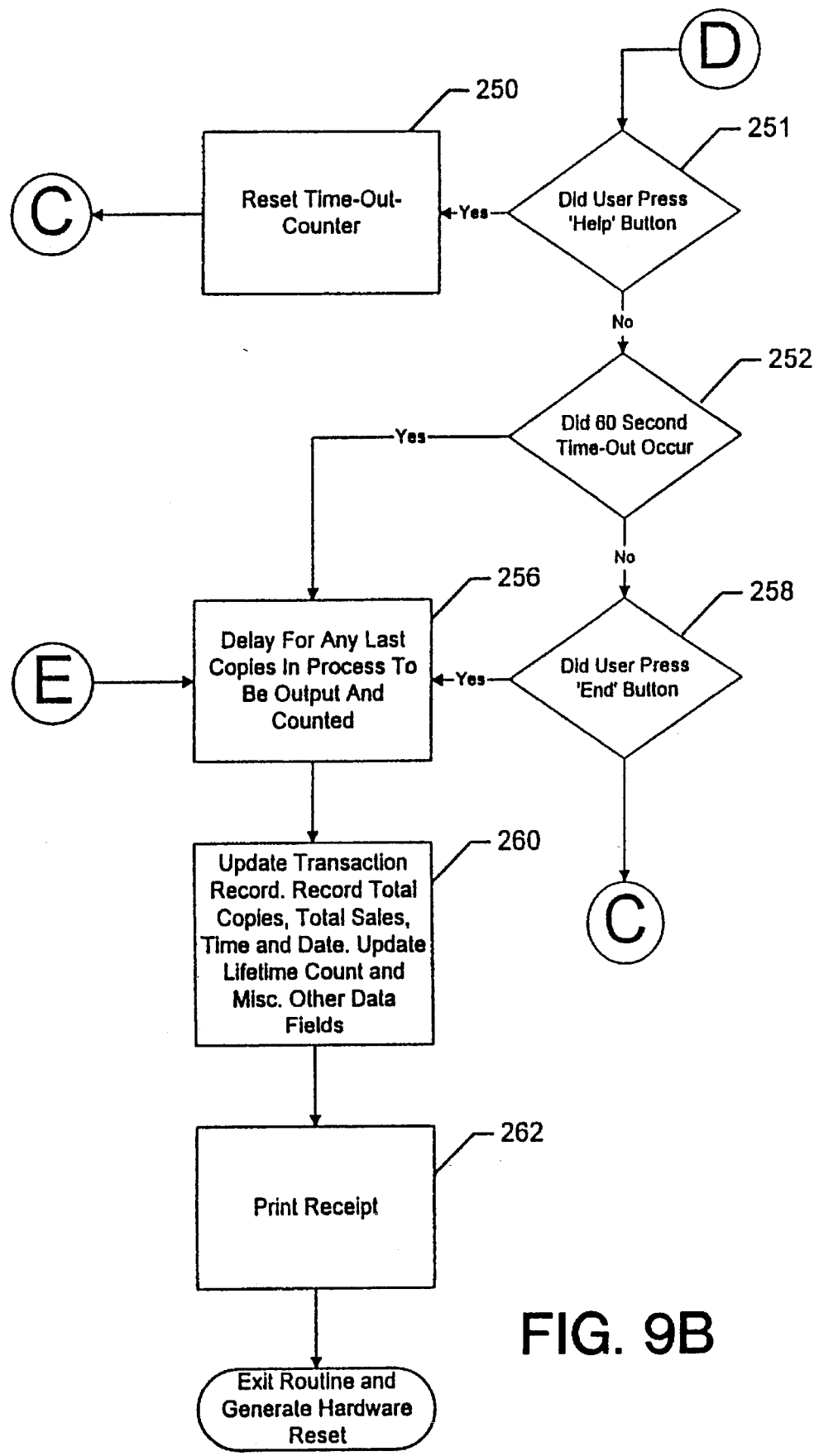

If the 40-second time-out did not occur then processing moves to block 251 shown in FIG. 9B, a determination is made in block 251 regarding whether the user has pressed the help button. If a HELP button has been pressed, processing moves to block 250 where the time-out counter is reset. Processing then re-enters block 240 and it is again determined whether a vend has occurred. If the HELP button was not pressed, processing moves to decision block 252 where it is determined whether the 60-second time-out has occurred. If yes, processing moves to block 256. If no, processing moves to block 258 where it is determined whether the user has pressed the END button. If the END button has not been pressed, processing again returns to block 240 to determine whether a vend has occurred. If either determination block 252 or block 258 is in the affirmative, processing moves to block 256 where a delay is effectuated to allow any last copies to be output and counted. Processing then moves to block 260 where the transaction record stored in memory is updated and the total number of copies, the total number of sales, the time, the date and any other information preset by the copy service operator is recorded. Processing then moves to block 262 where a receipt 24 is printed on receipt printer 20. Following block 262 Transaction Subroutine 220 is exited and a hardware reset occurs to ready controller 12 and copier 28 for the next user.

Figure 10:
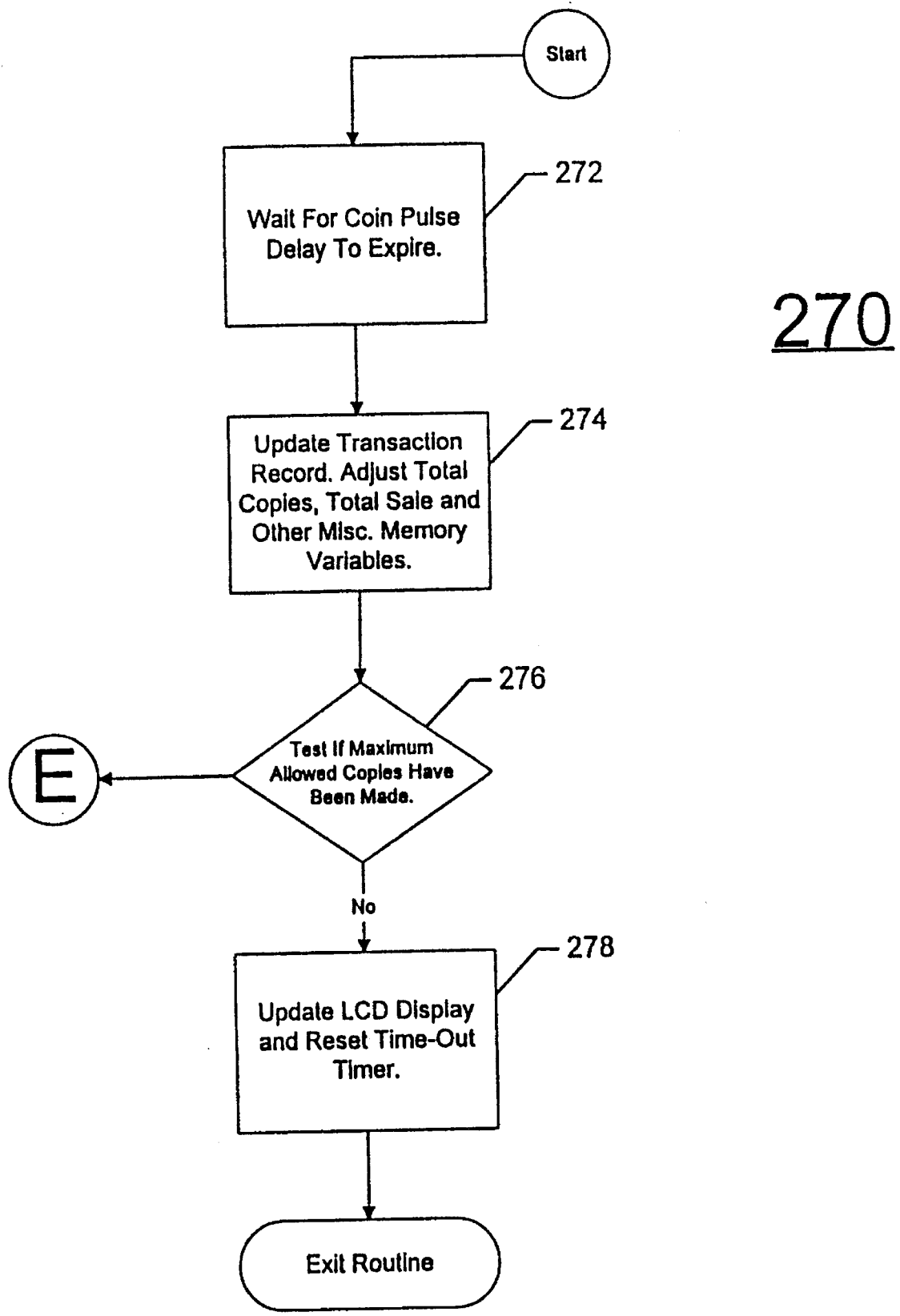
FIG. 10 is a flow diagram showing a subroutine for ensuring that a proper vend has occurred and that the total number of copies is less than the maximum allowed in accordance with the present invention.

There shown in FIG. 10 Vend Copy Subroutine 270. This subroutine performs a delay to ensure accurate copy pulse counting and determining if preset conditions (such as number of copies) have been reached. If a preset number of conditions has been reached, the transaction is terminated. As previously discussed, copier 28 copies based on supplying a COPY OK enable signal. Counting pulses allows controller 12 to control and monitor copier 28 output.

Vend Copy Subroutine 270 begins by entering block 272 where processing awaits any copy pulse delays to expire. Processing then moves to block 274 where the transaction record is updated; total copies are adjusted, total sales and other miscellaneous memory variables are updated. Processing then moves to block 276 where it is determined if the maximum allowed copies for the magnetic card being used has been made. If yes, processing moves to block 256 shown in FIG. 9B. If not, processing moves to block 278 where the LCD showing the number of copies and the time-out timer is reset. Following block 278 then copy subroutine 270 is exited.

As an example of operation, a VISA card may be used as the magnetic card to purchase copies on a Minolta EP 1080 copier (copier 28). A user passes the VISA card (swipes) through card reader 16. Track 2 of the multiple tracks on the credit card is read and serially transmits 37 bytes of data from the magnetic card reader to CPU 50. Controller 12 then takes the modem off hook and dials remote credit verification location 46. A $10 amount is transmitted from controller 12 to remote credit verification location 46 over telephone lines 40.

Remote credit verification location 46 verifies that the credit card account is valid and that the requested authorization amount is available. This amount of credit is reserved by the credit card processor according to its own terms and government regulations (typically several days).

When a successful authorization has taken place, remote credit verification location 46 transmits an authorization code (approval code) granting the authorizing the transaction. The approval code and credit card data are then stored in RAM 56. The modem is taken off hook, ending the communication.

The user is then prompted through display 14 and/or speaker 22 to begin making copies. The Omron relay within controller 12 is activated, enabling the vend circuit. On the EP 1080 the blue/green wire pair in the coin acceptor plug are connected to each other. If remote credit verification location returns any message other than an authorization code, the communication is also terminated and the user is prompted that the card can not be processed at this time.

While enabled, the user can make copies and use any of the copier features. During a copy cycle, the output monitoring line is toggled low (+0 volts) and returned high (+24 volts). In the EP 1080 the red/blue pair of wires in the coin acceptor plug provide the output pulses. The red wire in the coin acceptor plug provides a +24 volt reference voltage and the blue wire transitions to provide the negative output pulse. This logic transition or pulse is detected by controller 12 on control line 26 and counted as one copy.

Next, controller 12 checks to see if the maximum allowed number of copies per authorization amount has been reached. If the maximum has been reached or no copies have been made in the last 60 seconds, the transaction is terminated. Terminating a transaction involves saving the transaction information in RAM (which can include date, time, total copies, total sales, etc.), prompting the user that the transaction is complete and printing a receipt. The Omron relay is deactivated and copier 28 taken out of the vend mode.

On a daily basis (or other period of time), a phone call is placed to a remote location 44 which is designated to receive batch settlement information. When a communication link is established and appropriate security, if any, cleared, card data, approval codes and transaction amounts are transmitted. This Upload is a batch settlement. When the batch settlement is complete, a settlement approval code is received by controller 12 from remote location 44. The communication link is then terminated.

When the batch has been settled, a telephone call is placed to remote service location 42 which is the copy service operator. After a communication link is established, any system error messages, miscellaneous transaction information (such as dates, times, types of transactions, etc.) and batch settlement information (including the settlement approval code) is transmitted from controller 12 to remote service location 42. Remote service location 42 then transmits an acknowledgement signal to controller 12. The communication link is then terminated and memory cleared. System 10 is then ready for vending.

Figure 11:
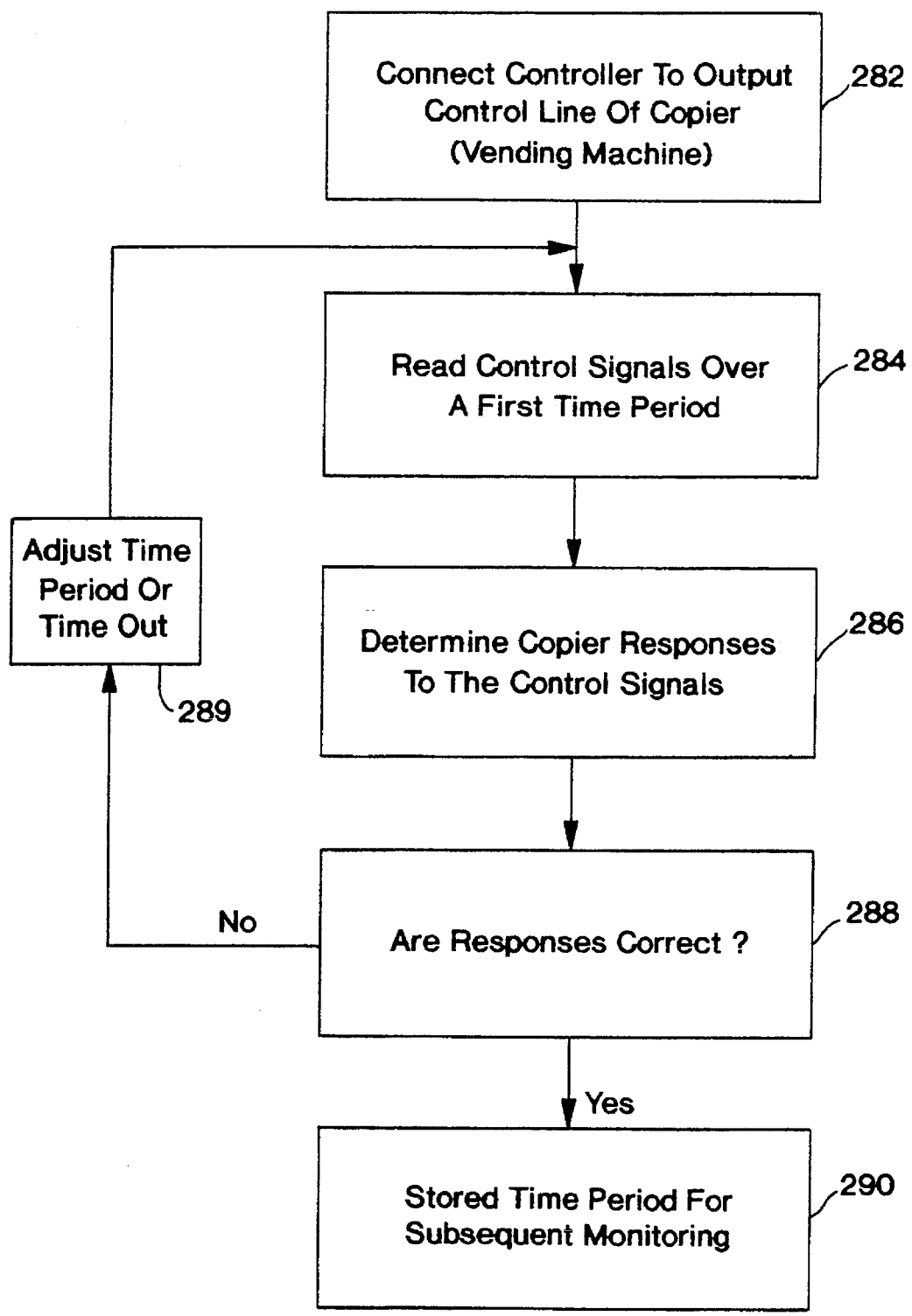
FIG. 11 is a flow diagram showing the general operation of the system in accordance with the present invention.

FIG. 11 is a flow diagram 280 showing general operation of one aspect of the present invention. In block 282 controller 12 is connected to output control line 26 of copier 28. Copier 28 is an exemplary embodiment of a vending machine which can be operated in accordance with the present invention. In block 284, the control signals which control copier 28 are read over a first time period. The first time period is preset for controller 12. Interfacing with a copier 28 or other vending machine is an iterative process of reading control signals and comparing them to a stored list in memory until a match is made. In block 286 copier responses are determined and compared to the control signals. This may be done interactively with an operator. As the operator depresses the copy button, controller reads the control signals at switch 38 put out by copier 28. When controller 12 identified a control signal indicating a copy is made, controller 12 displays this information to the operator through display 14.

In block 288, the determined response is checked for correctness. If the response is incorrect, the process proceeds to block 289 where the time period is adjusted and operation returns to block 284. If the determined response is correct, then, in block 290, the time period which generated a correct response is stored for subsequent monitoring of the vending machine.

Figure 12:
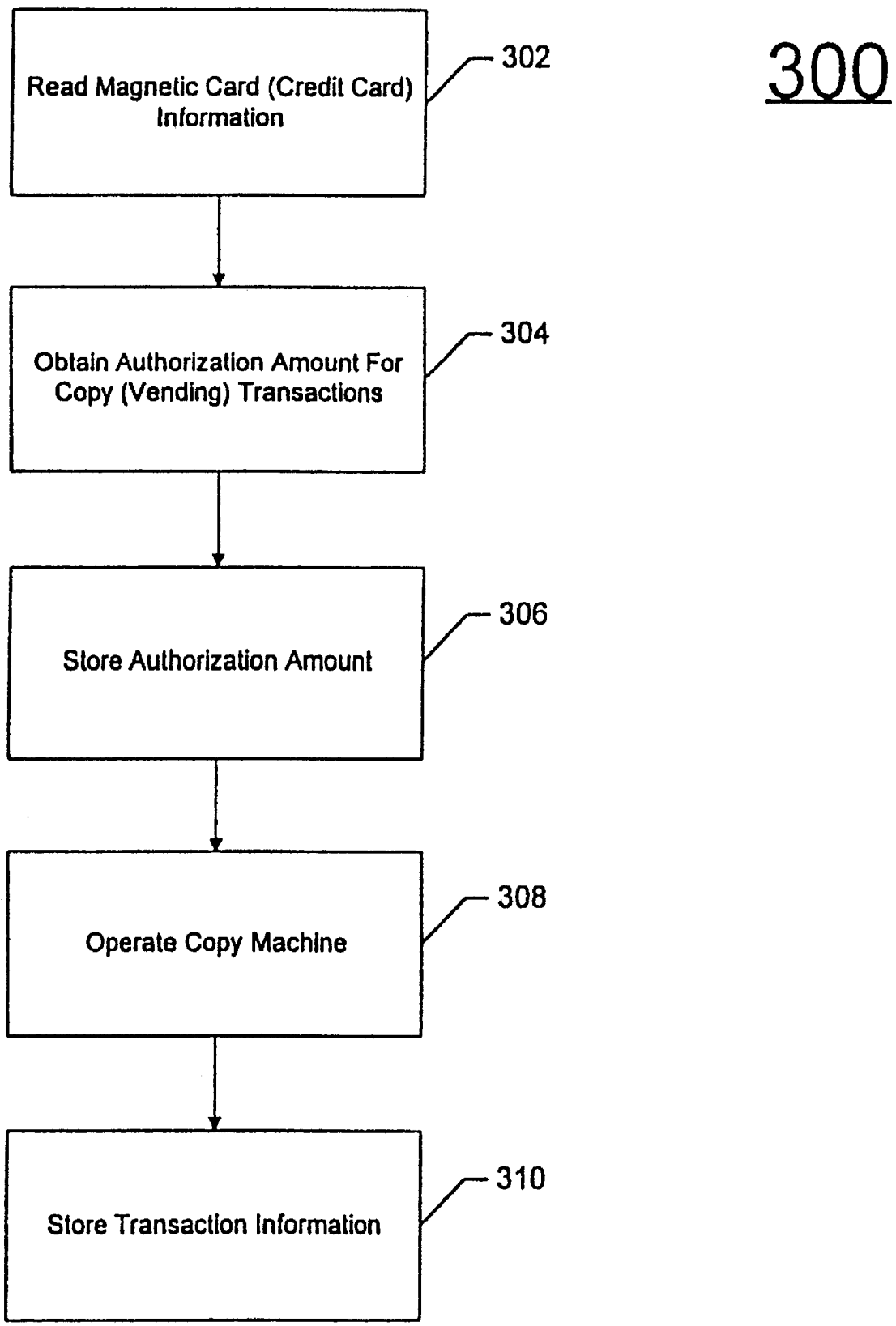
FIG. 12 is a flow diagram showing the general operation of an additional embodiment of the present invention.

There show in FIG. 12 flow diagram 300 showing another aspect of the present invention.

In block 302 magnetic card information such as information encoded on a credit card is read. As previously discussed, other types of magnetic card information can be read, depending upon the type magnetic card used. In block 304 an authorization amount for a particular transaction is obtained. In the case of copier 28 an authorization for a predetermined amount of copying is obtained. In an alternative embodiment, a user may enter the amount of credit the user desires.

In block 306, the authorization amount obtained in block 304 is stored in memory. In block 308 the copy machine is operated following the storage of an authorization amount from block 306. Finally, in block 310 following the completion of the copy transaction, the transaction information is stored in memory.

While particular embodiments of the present invention are disclosed herein, it is not intended to limit the invention to such disclosure, and changes and modifications may be incorporated and embodied within the scope of the following claims:

What is claimed:

1. A system for initializing an interface between a control device and a vending machine, said vending machine having control lines along which are transmitted control signals in the form of pulses for controlling operation of said vending machine, said system comprising:

a) means for connecting said control device to said control lines;

b) means for reading, in response to vending machine actuation, said control signals transmitted over said control lines during a period of time;

c) means for processing said read control signals and determining operational responses of said vending machine which correspond to said read control signals; and d) means, responsive to user input, for adjusting the time period by a predetermined amount if the operational responses determined by the means for processing and determining are incorrect and returning operation to the means for reading.

2. The system in accordance with claim 1 wherein said means for adjusting said period of time predetermined amounts of time until either a re-read control signal matches repeatedly adjusts the time period until a correct operational response is determined by said means for processing or a maximum time limit has been reached.

3. The system in accordance with claim 1 wherein said vending machine is a copy machine.

4. The system in accordance with claim 1 wherein said vending machine is a computer.

5. The system in accordance with claim 1 wherein said vending machine is a micro film reader.

6. The system in accordance with claim 1 wherein said control signals are current levels.

7. The system in accordance with claim 1 wherein said control signals are voltage levels.

8. A method for initializing an interface between a control device and a vending machine, said vending machine having control lines along which are transmitted control signals in the form of pulses for controlling operation of said vending machine, said method comprising the steps of:

a) connecting said control device to said control lines;

b) reading, in response to vending machine actuation, said control signals transmitted over said control lines during a period of time;

c) processing said read control signals and determining, by said control device, operational responses of said vending machine which correspond to said read control signals; and d) adjusting, responsive to user input, the period of time by a predetermined amount if the operational responses determined are incorrect and returning to step (b).

9. A method for establishing an appropriate time period during which control signals corresponding to operational responses of a vending machine can be monitored, said vending machine having control lines along which are transmitted control signals for controlling vending operation of said vending machine, said method comprising the steps of:

a) accessing the vending machine control lines by connecting a control device to said control lines;

b) causing the vending machine to perform a vending operation and transmit a corresponding control signal;

c) reading control signals, by said control device, transmitted in response to step b) on said control lines over a predetermined period of time;

d) processing, by said control device, said read control signals and determining which vending operation corresponds to the read control signals;

e) if the determined vending operation does not correspond to the read control signal, adjusting the predetermined period of time, by a predetermined amount, over which the control signals were read and returning to step (b);

f) if the determined vending operation corresponds to the read control signal, storing and establishing the time period for subsequent vending machine monitoring.

* * * * *

UNITED STATES PATENT AND TRADEMARK OFFICE
CERTIFICATE OF CORRECTION

PATENT NO. : 5,619,024
DATED : April 8, 1997
INVENTOR(S) : Brock Kolls

It is certified that error appears in the above-indentified patent and that said Letters Patent is hereby corrected as shown below:

Column 16, claim 2, lines 9 and 10, delete --predetermined amounts of time until either a re-read control signal matches--.

Signed and Sealed this

Thirtieth Day of September, 1997

*Attest:*

BRUCE LEHMAN

*Attesting Officer*   *Commissioner of Patents and Trademarks*